P. K. DEDERICK.
Process of Baling Cotton, &c.

No. 233,603.

2 Sheets—Sheet 1.

Patented Oct. 26, 1880.

Attest,
W. H. H. Knight.
Emanuel Blout.

Inventor,
P. K. Dederick.

2 Sheets—Sheet 2.

P. K. DEDERICK.
Process of Baling Cotton, &c.

No. 233,603. Patented Oct. 26, 1880.

Attest,
Wm H. N. Knight
E. Blout

Inventor.
P. K. Dederick
By L. Hill
His atty

UNITED STATES PATENT OFFICE.

PETER K. DEDERICK, OF ALBANY, NEW YORK.

PROCESS OF BALING COTTON, &c.

SPECIFICATION forming part of Letters Patent No. 233,603, dated October 26, 1880.

Application filed June 19, 1879.

*To all whom it may concern:*

Be it known that I, PETER K. DEDERICK, of Albany, Albany county, New York, have invented a certain new and Improved Mode or Process of Baling Cotton, &c.; and I do hereby declare the following to be a full, clear, and exact description of the same, reference being had to the accompanying drawings, forming part of this specification, in which—

Figure 1:
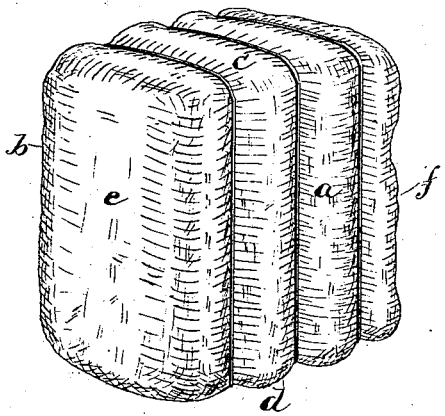
Figure 2:
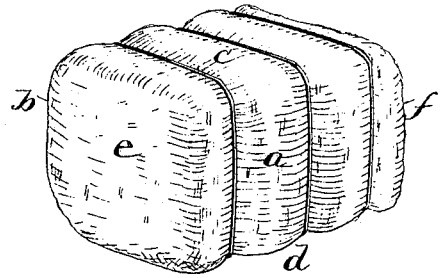
Figure 3:
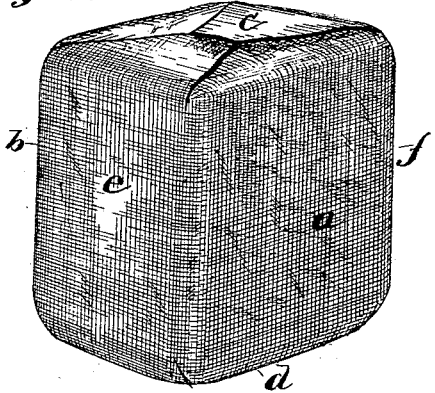
Figure 4:
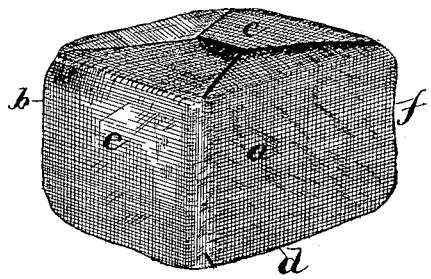
Figure 5:
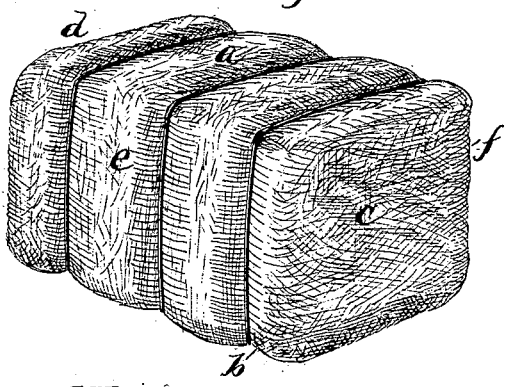
Figure 6:
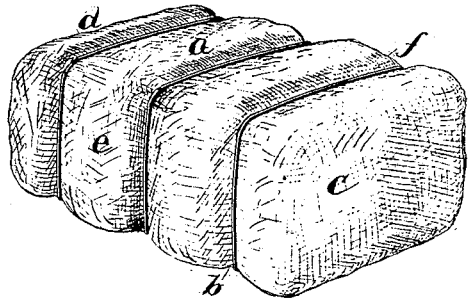
Figure 7:
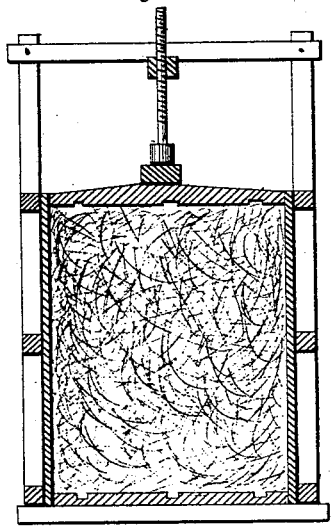
Figure 8:
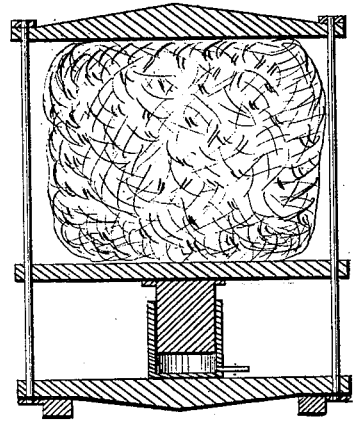
Figure 9:
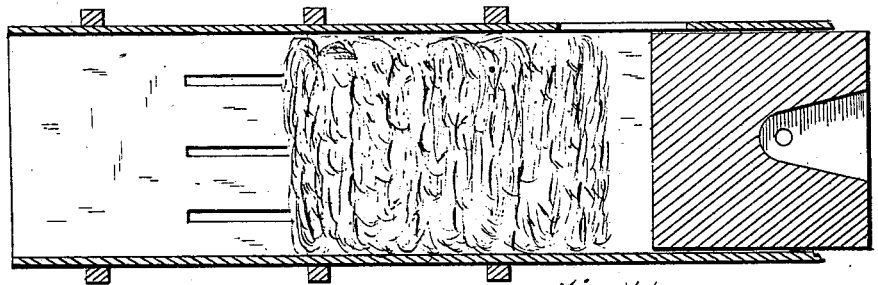
Figures 10, 11:
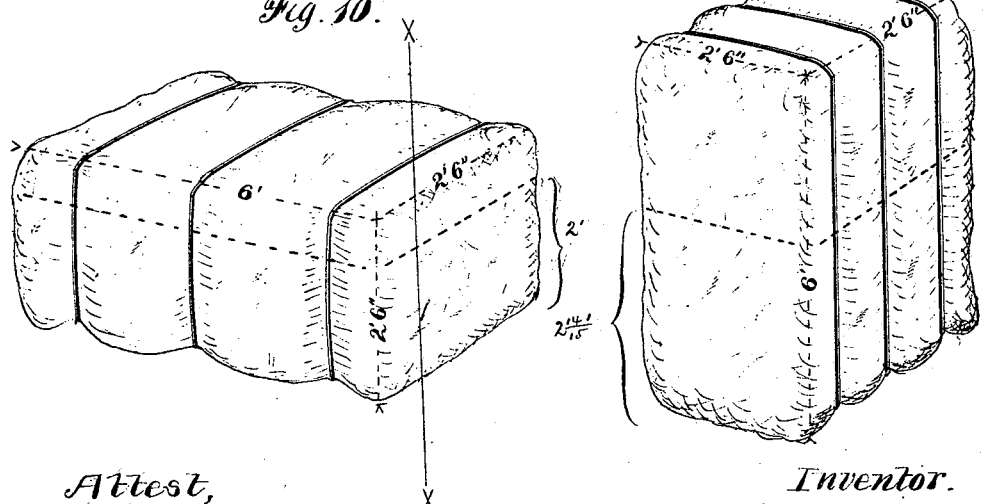

Figure 1 represents, in perspective, an uncovered bale of cotton packed according to the first step of my improved mode, and pressed, but not compressed. Fig. 2 represents the same bale finished by compression and tied off. Fig. 3 represents the unfinished bale shown in Fig. 1 covered, but not compressed. Fig. 4 represents the finished bale shown in Fig. 2 tied off and covered. Fig. 5 represents a bale packed, pressed, and tied off according to the old-fashioned method, but not compressed. Fig. 6 represents the bale shown in Fig. 5 after it has been compressed and tied off. Fig. 7 is a diagram illustrating the old mode of packing and pressing. Fig. 8 is a diagram illustrating the old mode of compressing the bale shown in Fig. 7. Fig. 9 is a diagram illustrating my new mode of compressing the bale. Figs. 10 and 11 are diagrams illustrating the advantages of the new mode over the old mode.

Similar letters of reference in the several figures denote the same parts.

The common mode of baling cotton heretofore has been to place loosely in the press a sufficient quantity of cotton to form a bale, and then to press it to the required dimensions, place the bands around it, tie it off, and discharge it from the press. The bales thus formed are shown in Fig. 5. They contain cotton packed in miscellaneously, with the fibers locked and interlocked in every direction, from one side of the bale to the other, and from one end to the other. These fibers are, by the action of the press, crushed down, for the most part, to a horizontal position, lying substantially parallel to the large sides *a b*, and with their ends toward the ends *c d* or the vertical sides *e f* of the bale. In the press the bale rests on the large under side, *b*, and the platen acts on the large upper side, *a*. The tendency of the fibers being to spring back in the direction opposite to that in which they were pressed between the platen and the bottom of the bale-chamber, the bands must necessarily be placed around the bales not longitudinally, or in the direction of the greatest length of the bales, but transversely, or in a direction at right angles to their greatest length, so as to most effectually resist the expansion of the cotton after the bale is discharged. This old mode of pressing is fully illustrated in Fig. 7. After being thus pressed and tied off, the bales were ready for use in the immediate vicinity or for transportation short distances where bulk was an element of no great importance. They were also sufficiently loose to be readily examined and inspected by pulling out from the bale such portions of the cotton as should correctly indicate the quality and market grade of the baled article; but on arriving at the seaboard or the railway-depots, whence they were to be shipped to the market, it was necessary to further compress them in order that they should occupy less space and the cost of transportation should be reduced. To this end they were placed in very powerful presses, which, for clearness of description, I will designate as "compresses," and were compressed to a small bulk and again tied off, either by taking up the slack of the old bands or by applying new ones. This compression had also necessarily to be in the same direction from side *a* to side *b*, or vice versa, as before, and the bands had to be applied in the same direction as before in order to hold the compressed material from bulging out or unduly expanding when removed from the compress. This old mode of compression is fully represented in Fig. 8, and the resulting compressed bale is shown in Fig. 6. It happened, however, that the bands could not be tied off without more or less slack, and that when the compressed bale was discharged from the compress the bands, under the great expansive force of the cotton, would cut into the corners of the bale, from both of which causes the cotton would expand considerably in the direction of the sides *a b* over the whole extent of the bale, but more especially would bulge or round up along the middle of the bale, causing it to occupy a much larger space than it occupied when actually in the compress. Thus a bale five feet long, four feet wide, and three feet six inches high would, after compression to eight inches thick, be liable to expand back to perhaps two feet in thickness or height from side *a* to side *b*, or would so expand and bulge as to occupy the space required for a bale five feet long, four feet wide, and two feet thick or high. This great expansion arose, as before stated, from the slack of the band and from the great width of the bale, which enabled the middle portions to act with undue leverage on the bands, and thus draw them into the corners of the package.

The object of my invention is to obviate as far as practicable these difficulties; and I attain the object by a new mode of packing, pressing, tying off, compressing, and again tying off the bale, with or without the covering, as I will now proceed to describe.

In the first place I rearrange and adjust the dimensions of the bale-chamber so that the bale can be packed and pressed in the direction of its greatest resulting length, instead of in the direction of its shorter dimensions. In order to accomplish this the cross-section of the bale-chamber must be contracted to the desired width and thickness of the bale, and if the old-fashioned mode of pressing the bale by a single stroke of the platen be employed, the bale-chamber must be suitably elongated to receive and contain the necessary quantity of cotton to form such bale; but I prefer to build up the bale by means of successive layers of cotton, each rammed home by a separate stroke of the platen, as described in my Letters Patent No. 132,566, granted October 29, 1872, and reissued (Division B) July 2, 1878, No. 8,317, and in other Letters Patent heretofore granted to me for continuous baling-presses. It will be seen, therefore, that this first step, considered by itself and apart from the subsequent step or steps, is not now a new invention, but is substantially contained in my former patents above referred to. The resulting bale, packed and pressed in the direction of its greatest length, must be substantially of an oblong quadrilateral form, or otherwise the desired advantages will either not be attained by my process or will be offset by counterbalancing disadvantages, and the press must be adapted to producing such form.

The bale is tied off, while in the press, by means of bands placed around it in the direction of its greatest length. After being tied off it may be ejected into a bag or cover, *g*, or may be covered with suitable cloth after ejection, if desired, both the covered and uncovered forms being shown in the drawings, Figs. 3 and 1, and the covering not being material to the process herein described and claimed.

After the bale is thus formed, pressed, and tied off, it is, as the second step of my process, subsequently subjected to the action of a powerful compressing-press, by which it is compressed still farther in the direction of its greatest length, and is thereby condensed and greatly reduced in length. To this end the compress bale-chamber must be adapted in dimensions to the width, length, and breadth of the pressed but uncompressed bale, and the movement of the platen and means for effecting the same must be adapted to compressing said bale endwise into a short compacted bale. This compressed bale is then tied off while in the compress, either by reusing the old bands or by means of new ones, and when tied off may be covered, if preferred, as shown in Fig. 4. The bands are applied around the compressed bale in the same direction as before—that is to say, in the direction of the pressing and compressing pressure. This mode of compressing is fully illustrated in Fig. 9, and the resulting compressed and tied bale is represented in Figs. 2 and 4, one being covered and the other uncovered. Now, the amount of slack in tying off a bale thus compressed by my new process is the same as in tying a bale compressed by the old processes—that is to say, the slack is occasioned only by the difficulty experienced in tying or drawing the knot or connection tight, and this difficulty is substantially the same by both processes. The linear back expansion after the bale is compressed will therefore be the same in both cases.

The cutting of the bands into the corners of the bale may be assumed to be the same by the new as by the old process where the width and breadth of the new bales are the same as of the old ones; hence it follows that the increase of bulk by back expansion, being measured in both cases by the cross-section multiplied into the linear back expansion, will be as much greater in the old bales than in the new as the cross-sectional area of the old taken at right angles to the direction of pressure exceeds that of the new. This is best illustrated by diagrams, and will be plainly seen by reference to Figs. 10 and 11.

Fig. 10 represents a bale six feet long, two and one-half feet wide, and two and one-half feet high pressed by the old mode. This bale contains thirty-seven and one-half cubic feet. In compressing it, which must be done by pressure applied in the direction *x x*, it may be reduced in the compress to eight inches high and then tied off, in which condition it will occupy ten cubic feet; but when removed from the compress it will expand back to about two feet high, and then occupy thirty cubic feet. The gain in reduction of size by compression by the old process is thus about seven cubic feet.

Fig. 11 represents a bale of the same dimensions pressed by my new mode—*i. e.*, endwise—and containing the same quantity of cotton as the bale shown in Fig. 10. This bale, with the same amount of force, can be compressed so as to occupy but ten cubic feet—the same as the old bale shown in Fig. 10; but in compressing it endwise to ten cubic feet its length will be reduced to one and three-fifths foot. It will then, after being tied off, expand back the same as before, sixteen inches, and will be two and fourteen-fifteenths feet in height. At that height it will occupy eighteen and one-third cubic feet. The gain by compression will thus be nineteen and one-sixth cubic feet. The gain over the old mode of compressing will be more than two and one-half to one, and the bale, instead of occupying about thirty thirty-sevenths of its original space, will only occupy about eighteen thirty-sevenths thereof. In other words, starting with the same quantity of cotton in the beginning, I can, by my new mode of pressing and compressing, ship it in little more than one-half the space required by the old mode, and the cost of transportation will be reduced nearly fifty per cent.

This mode of pressing and compressing may be applied to other articles than cotton, and generally to any soft fibrous material. It will be of great value in the transportation of bran and other similar light substances. In pressing and compressing such material as bran the bale-covers should, preferably, be used around the pressed and tied and around the compressed and tied bales. With such materials a wisp of hay or straw may, if preferred, be placed at the ends of the package under the bands to prevent them from cutting into the material, although I have found no difficulty in pressing and compressing bran by simply subjecting it to the press, tying it off, covering it, compressing the bales, tying them off, and covering them, as described for cotton and other materials having a longer fiber than bran.

Where bran and other articles of short fiber are packed the bands will hold the material, pressed or compressed, from expansion, and the cover will prevent any waste from between the bands, and will also keep it clean. With cotton, wool, and other articles of long tenacious fiber, the main object of the covers is to keep the material clean. The covers are to be removed before compressing.

I do not limit my invention to bales built up of different separately-pressed layers, nor to covered bales; but

What I claim is—

The method or process of pressing and compressing bales of fibrous material, consisting in pressing the material into oblong quadrilateral bales in a baling-press by pressure applied in the direction of the greatest length of the resulting bale, tying off such oblong pressed bales while in the press by bands applied around them in the direction of their greatest length, subjecting the pressed bales to increased pressure applied in the direction of their greatest length in a compress to further condense them, and, finally, tying off the compressed bale by bands applied in the same direction in which the compressing-pressure was applied, substantially as described.

P. K. DEDERICK.

Witnesses:
W. A. SKINKLE,
C. R. DEDERICK.